Dec. 2, 1930.  W. D. WATERMAN  1,783,529
AEROPLANE CONTROL
Filed Oct. 13, 1928  2 Sheets-Sheet 1

Inventor
Waldo D. Waterman
By Lyon & Lyon
Attorneys

Dec. 2, 1930. W. D. WATERMAN 1,783,529
AEROPLANE CONTROL
Filed Oct. 13, 1928 2 Sheets-Sheet 2
*Fig. 3.*
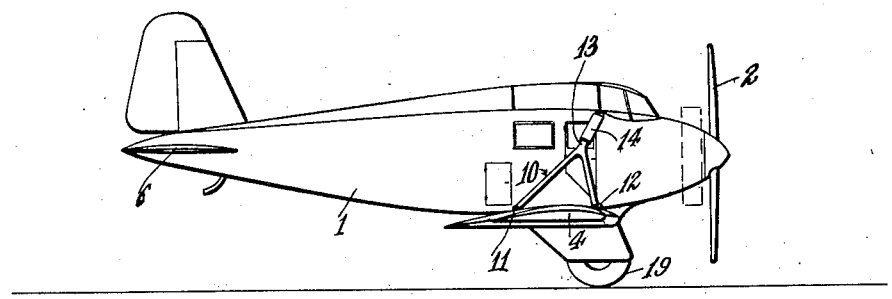
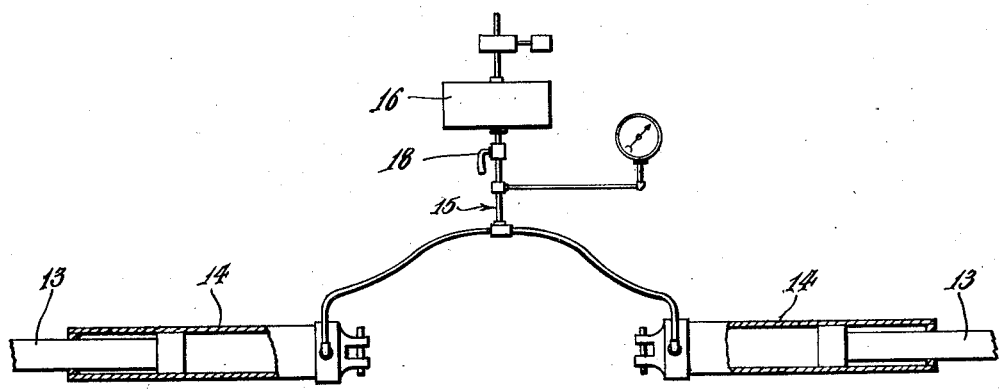
*Fig. 4.*
Inventor
Waldo D. Waterman
By Lyon & Lyon
Attorneys

Patented Dec. 2, 1930

1,783,529

UNITED STATES PATENT OFFICE

WALDO D. WATERMAN, OF SANTA MONICA CANYON, CALIFORNIA

AEROPLANE CONTROL

Application filed October 13, 1928. Serial No. 312,242.

This invention relates to aeroplane controls, and is more particularly related to an aeroplane having its wings so secured to the fuselage of the plane as to maintain stability of the plane during flight by permitting variations of the "angles of incidence" of the wings relative to the fuselage to compensate automatically for air pressure variations during flight; and also to the manner of so connecting the wings to the fuselage of the aeroplane and together as to permit predetermined variations of the angles of incidence of the planes with respect to the fuselage by the consequent variations of the dihedral angles of the wings to meet flying conditions, such a "taking-off" and "landing", cruising, etc.

In this specification, the "angle of incidence" is referred to as the angle that the chord (usually the under surface of the wing is flat on the bottom) of the wing makes with the line of flight of the aeroplane. "Dihedral angle" is referred to as the angle that a projection of one wing from its root makes with the opposite wing. "Center of lift" refers to a point at which the lift in a wing can be considered as concentrated for any particular or specified angle of incidence of the wing.

In the carrying out of this invention, two fundamental aerodynamic principles are involved. Within certain limits, other conditions being equal, the lift of an airfoil increases with the angle of the incidence of the wings or planes, and the center of lift moves forward when the angle of incidence is increased.

Under flying conditions, particularly in rough air, changes in lateral attitude are caused by an increase in lift on one wing, or by a decrease in lift on the other wing. If one wing has an increase in lift, it tops the plane up on that side. An airfoil is inherently unstable fore and aft owing to the direction of center of lift travel thereof. When the average aeroplane "tails down", the angle of incidence increases, causing the center of lift to move forwardly of the plane, accentuating the "tail down" position.

Under conditions of "taking off", "landing" and "climbing", an aeroplane functions more efficiently with a relatively high angle of incidence, while in a high speed condition a negative angle of incidence is desirable and in "cruising" an approximate zero angle of incidence is preferred. By the variation of the angle of incidence with respect to the fuselage at the will of the pilot, the most suitable condition can be obtained for every condition of flight. This will enable a plane to "take-off" and "land" in a shorter distance, climb more rapidly and have a higher maximum and cruising speed than in the case of a plane with a fixed angle of incidence which could only reach maximum efficiency under one specific condition.

It is, therefore, an object of my invention to provide an aeroplane in which means are provided for controlling the wings, and for securing the wings to the fuselage of the plane, and to each other, in such a manner as to permit variations of the angles of incidence of the plane in accordance with the desired or inherent conditions encountered in flying.

Another object of my invention is to provide an aeroplane including a fuselage to which the wings of the plane are secured, or hinged, at an angle to the flight of the aeroplane, and means connecting the wings together so that a variation of the angle of incidence of one wing is compensated for by a corresponding, or similar, change in the angle of incidence of the opposed wing.

Another object of my invention is to provide an aeroplane which through the flexible connection of the wings to the fuselage, will be shock absorbing. This will greatly increase the life of the plane and materially add to the comfort of its occupants, particularly while encountering rough and bumpy air.

Other objects and advantages of this invention it is believed will be apparent from the following detailed description of a preferred embodiment thereof as illustrated in the accompanying drawings.

In the drawings:

Figure 3 is a side elevation thereof.

Figure 4 is a diagrammatic view of the aeroplane control or wing shock-absorbing means embodied in this invention.

Figure 1:
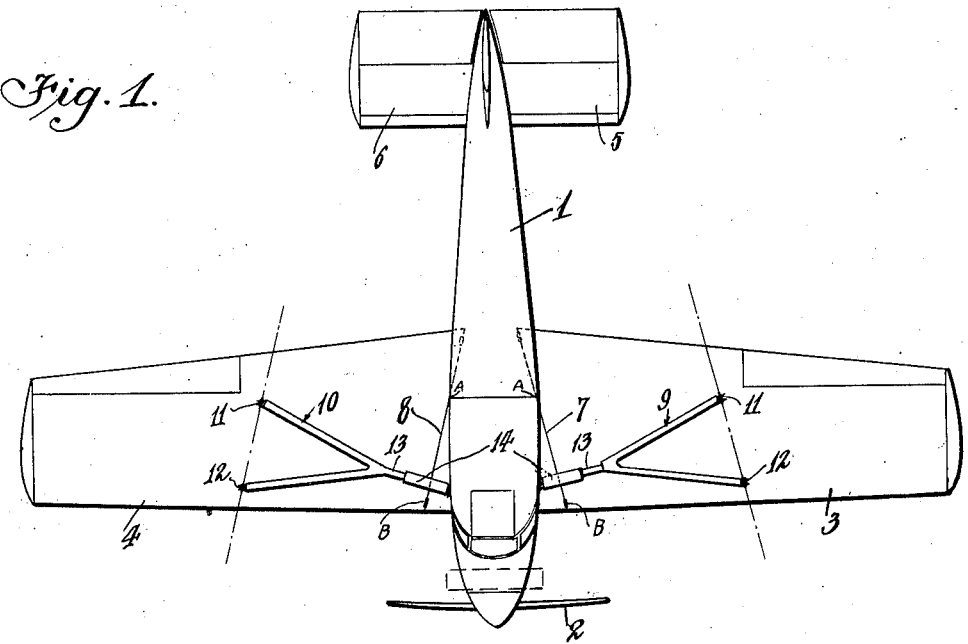
Figure 1 is a top plan view of an aeroplane embodying my invention.
Figure 2:
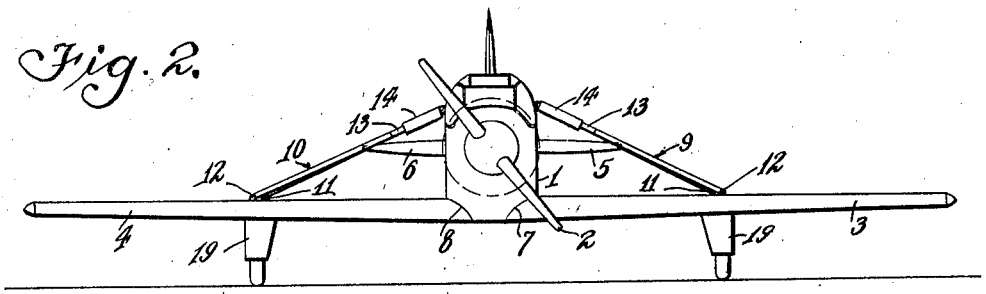
Figure 2 is a front elevation thereof.

In the preferred embodiment of the invention illustrated in the accompanying drawings, 1 indicates the fuselage of an aeroplane, which may be of any suitable or desirable construction, and which carries the customary motor and propeller 2 or any other suitable propulsion device. The fuselage 1 is provided with wings 3 and 4 and tail planes 5 and 6.

My invention is particularly related to the manner of connecting the wings 3 and 4 to the fuselage of the aeroplane, and these wings 3 and 4 are mounted, or connected, with the fuselage 1 at substantially horizontal hinges 7 and 8, the axis of which hinges is designated by the line A—B. The line A—B extends at an angle from the line of flight of the aeroplane so that the two lines A and B, if continued, would meet at a point to the rear of the aeroplane wings.

Means are provided for connecting the wings 3 and 4 together, which means preferably comprise brace forks 9 and 10 which are pivotally connected to the wings at points 11 and 12. A line drawn between the points 11 and 12 would be substantially parallel to the line A—B, or the horizontal axis of the hinge connections of the wings 3 and 4 to the fuselage 1. The forks 9 and 10 are formed with rods, or pistons, 13, extending from their apexes, and these pistons 13 extend into cylinders 14 which are pivotally connected with the fuselage 1 of the plane. The cylinders 14 are connected together and with a source of fluid under pressure by means of a conduit 15. A storage tank 16 of fluid under pressure is mounted within the conduit 15 and the pressure of the fluid within the storage tank 16 is controlled from any suitable or desirable source, such as from a compressor tank containing fluid under a high pressure, or from a motor driven by the motor of the aeroplane, so that the fluid pressure in the cylinders 14 may be varied in accordance with the particular flying conditions to regulate the angularity of the wings 3 and 4 with respect to the fuselage 1.

The pressure contained within the cylinders 14 determines the normal position of the wings 3 and 4 and when the air pressure conditions vary to change the angle of the wing on one side of the plane, for example, the wing 3, a complementary change is caused in the angularity of the wing 4 to stabilize in the flight of the aeroplane by varying the angle of incidence of the wing 4 in accordance with the variation of the angle of incidence caused in the wing 3 by variation of the air pressure which the plane encounters on one wing. This automatic variation of one wing 4 to compensate for a variation in the angle of incidence of the wing 3 maintains the plane stable, and prevents rolling or rocking of the plane when traveling through rough air.

The above description is a means of variable connection of the wings to the fuselage, which will make possible the use of all the features of my invention. Other connections can be made such as a system of cranks and levers or a worm gear, substituting or in connection with the above described means if it is found desirable.

When it is desired to "take-off", "climb" or "land" the plane, the pressure within the cylinders 14 may be increased or varied which will decrease the dihedral angle and increase the angle of incidence.

When it is desired to obtain the most efficient speed or cruising condition, the pressure of the fluid within cylinders 14 may be decreased by actuating a release valve 18 mounted in the connecting conduit 15 and permit the wings 3 and 4 to pivot upwardly, increasing the dihedral angle and decreasing the angle of incidence of the wings.

Automatic lateral stability is attained as follows: A change in lateral attitude can only be caused by an increase in lift of one wing with respect to the other. This will cause the wing to flex upward, which will cause a decrease in angle of incidence and lift. In so doing, the pressure of the fluid in cylinders 14 is increased equally as they are interconnected by conduit 15. With an increase over normal pressure in the opposite cylinder, the opposite wing will be flexed downward, causing an increase in angle of incidence and a corresponding decrease in lift. This combined action will immediately bring the plane back to normal lateral attitude, which will accomplish the automatic stability which my invention claims.

Automatic longitudinal stability is attained as follows: Changes in longitudinal attitude are caused by change in proportionate lift between the wings and the fixed horizontal tail plane. If the proportionate lift is increased in the wings, they will flex upwardly, decreasing the angle of incidence and their lift, the angle of incidence of the fixed tail plane remaining constant. This action tends to nose the plane upwards. The resultant change in angle of incidence will cause the nose to drop through a decrease in lift, bringing the plane back to an even keel. Conversely a decrease in lift of the wings which would cause the nose to drop would cause the wings to flex downwardly, causing an increase of angle of incidence and a corresponding increase in lift, again bringing the plane back to its normal attitude.

In accordance with my invention, an aeroplane having a control embodying my invention thereon may vary the angle of incidence of the airfoil in order to meet any particular flying conditions encountered, as to weight, air-pressure conditions, whether it is desired to land, rise, cruise or climb, obtaining the maximum efficiency from the particular airfoil structure under all flying conditions, and is also provided with an aeroplane from which rocking or rolling of the plane is eliminated when traveling through rough air due to the stability of the plane enabled by permitting one wing of the plane to move to a position to compensate for the pressure changes caused by varying air conditions under, or in respect to, the opposed wing of the aeroplane.

The aeroplane embodying my invention includes a landing gear 19 which may be of any suitable or desirable construction and which need not be provided with the shock-absorbing means customarily provided in such landing gears, as the shock-absorbing means, or control means, provided between the two wings of the aeroplane will take up the shocks imparted to the landing gear when landing or rising from the ground.

The landing gear being affixed to the wings 3 and 4, it will be obvious that as the plane is lowered for landing, the dihedral angle may be decreased, thereby increasing the angle of incidence of the wings and permitting the plane to be settled more slowly to the ground, and permitting the plane to be lowered and landed at lower speed and to be stopped in a shorter distance due to the collapsing effect produced by the folding of the wings or increasing of the dihedral angle due to the pressure applied to the pivoted wings from the landing gear 19.

As previously set forth, the dihedral angle of the wings may be increased or decreased as desired to correspondingly increase or decrease the angle of incidence of both wings 3 and 4 by manipulating the valve 18 to increase the pressure in the cylinders 14, thereby decreasing the dihedral angle or by reducing the pressure in the cylinders 14 to permit the dihedral angle to increase, and the two wings 3 and 4 may be thus tilted to increase or decrease their dihedral angles a corresponding amount to meet any suited or desired condition, and after the angle of incidence of the wings and their dihedral angle has been set to meet any particular condition, a variation of that condition will be compensated for to give the plane stability by the dependent variation of the angles of the wings 3 and 4.

On landing, or immediately preceding landing, the operator of the plane may increase or decrease the dihedral angle and/or angle of incidence of the wings 3 and 4 as desired. In order to land the plane quickly, the dihedral angle may be increased by manipulation of the valve 18 to decrease the pressure in the cylinders 14 to allow the wings to fold up, decreasing the lifting qualities of the wings and permitting the plane to settle more quickly to the ground. On landing, the pressure creating against the landing gears secured to the wings 3 and 4 will further decrease the lifting qualities of the wings 3 and 4 causing the plane to remain on the ground because of the reduction thereby caused in the lifting qualities of said wings 3 and 4.

If it is desired to land the plane slowly, or at a slow speed, the lifting qualities of the wings may be increased immediately preceding landing by increasing pressure in the cylinders 14 so that the lifting qualities of said wings is increased, permitting the plane to be brought to the ground more slowly, and upon landing, the pressure created against the landing gears will decrease the lifting qualities of the wings so as to cause the ship to remain on the ground.

The sweep-back of the wings 3 and 4 of the plane, due to their angular pivotal connection with the fuselage, varies, as the dihedral angle of the wings is varied, or as the angle of incidence of the wings 3 and 4 is altered, either dependently or independently.

Having fully described my invention, it is to be understood that I do not wish to be limited to the details herein set forth, but my invention is of the full scope of the appended claims.

I claim:

1. In an aeroplane, the combination of a body, wings, means for pivotally connecting the wings to the body at an angle to the line of flight of the aeroplane, means interconnecting the said wings so that a change in position of one wing automatically brings about a corresponding change in the position of the opposed wing in the opposed direction, and a landing gear connected to said wings so that upon landing the positions of said wings will be automatically changed to reduce the lifting qualities of said wings.

2. In an aeroplane, the combination of a body, wings, means for pivotally connecting the wings to the body, means interconnecting the wings so that a change in the position of one wing brings about the change in the opposed wing to provide the necessary increase or decrease in lift of the latter said wing to maintain lateral stability, a landing gear connected with the said wings so that upon landing the said wings will pivot, resulting in a corresponding change in the lifting qualities of both wings.

3. In an aeroplane, the combination of a body, wings, means for pivotally connecting the wings to the body in such a manner that movement of the wings on the pivot brings about a change in the dihedral angle, the angle of incidence or the sweep-back of said wing, means for manually controlling the pivoting of said wings on said pivot, and means interconnecting the wings so that a change in the angle of incidence of one wing will be accompanied with a corresponding but opposed change in the angle of incidence of the other wing, a landing gear connected with said wing so that upon landing an automatic decrease in the lifting qualities of both of said wings is accomplished.

4. In an aeroplane, the combination of a body, wings, means for pivotally connecting the wings to the body in such a manner that movement of the wings on the pivot brings about a change in the dihedral angle, the angle of incidence or the sweep-back of said wing, means for manually controlling the pivoting of said wings on said pivot, means interconnecting the wings so that a change in the angle of one wing will be accompanied with a corresponding but opposed change in the angle of the other wing, a landing gear connected with said wing so that upon landing an automatic decrease in the lifting qualities of both of said wings is accomplished, and means controllable by the operator for determining the amount of automatic change in the lifting qualities of said wings on landing.

5. In an aeroplane, the combination of a body, wings, means for pivotally connecting the wings to the body in such a manner that a change in angularity brings about a change in the lifting qualities of said wings, fluid pressure means interconnecting said wings, a source of fluid under pressure, means for connecting a source of fluid under pressure with the said fluid pressure connecting means, a valve mounted in the means connecting the source of the fluid pressure with the first said fluid pressure connecting means and controllable by the operator of the aeroplane, and a landing gear connected to the wings so that upon landing the lifting qualities of both of said wings is decreased.

6. In an aeroplane, the combination of a body, a pair of wings, means for pivotally connecting the wings to the body, fluid pressure expansible means connected between the wings, a landing gear connected with each of said wings so that upon landing the angle of said wings is changed to reduce the lifting qualities of said wings.

7. In an aeroplane, the combination of a body, wings, means for pivotally connecting the wings to the body in such a manner that a change in the angularity of the wings brings about a change in lifting quality of said wings, interconnecting means between said wings, manually controlled means connecting with the latter said means so that a change in position of one wing may bring about such a change in position of the opposed wing as to provide the necessary increase or decrease in lift of said wings to maintain lateral stability, or so that a change in position of one wing may bring a corresponding change in position of the other of said wings in the same direction to vary the lifting qualities of both of said wings, and a landing gear connected with said wings so that upon landing one or more of said changes is automatically made, resulting in a like change in the lifting qualities of both wings.

Signed at Los Angeles, Cal., this 5th day of October, 1928.

WALDO D. WATERMAN.